(12) United States Patent
Vasquez et al.

(10) Patent No.: US 8,644,457 B1
(45) Date of Patent: Feb. 4, 2014

(54) SYSTEM AND METHOD FOR ENFORCING A RECORDING PREFERENCE

(71) Applicant: Google Inc., Mountain View, CA (US)

(72) Inventors: Juan Vasquez, San Jose, CA (US); Nazli Alagheband, San Francisco, CA (US); Mel Patrick McCarthy, Dublin (IE); Claus Regenbrecht, Dublin (IE)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/632,794

(22) Filed: Oct. 1, 2012

(51) Int. Cl.
*H04M 1/64* (2006.01)

(52) U.S. Cl.
USPC ..................... 379/88.01; 379/266.1

(58) Field of Classification Search
USPC ............... 379/41, 51, 68, 71, 73, 85, 88.01, 379/88.23, 142.07, 196, 211.01, 21, 5.01, 379/266.01, 266.1; 370/270
See application file for complete search history.

(56) References Cited

U.S. PATENT DOCUMENTS

| | | | |
|---|---|---|---|
| 6,097,792 A | 8/2000 | Thornton | |
| 6,393,269 B1 | 5/2002 | Hartmaier et al. | |
| 6,542,602 B1 | 4/2003 | Elazar | |
| 6,665,376 B1 * | 12/2003 | Brown | 379/85 |
| 6,718,022 B1 * | 4/2004 | Ehrlich et al. | 379/133 |
| 6,763,104 B1 | 7/2004 | Judkins et al. | |
| 6,870,835 B1 | 3/2005 | Chen et al. | |
| 6,970,554 B1 | 11/2005 | Peterson et al. | |
| 7,003,087 B2 | 2/2006 | Spencer et al. | |
| 7,233,980 B1 | 6/2007 | Holden et al. | |
| 7,295,660 B1 | 11/2007 | Higginbotham et al. | |
| 7,389,240 B2 | 6/2008 | Nygren et al. | |
| 7,602,895 B2 | 10/2009 | Terry et al. | |
| 7,738,638 B1 | 6/2010 | Henderson | |
| 7,894,596 B2 | 2/2011 | Moore et al. | |
| 7,933,388 B1 | 4/2011 | Vanier et al. | |
| 7,953,859 B1 * | 5/2011 | Kiefhaber et al. | 709/227 |
| 7,995,740 B2 | 8/2011 | Busey et al. | |
| 8,000,465 B2 | 8/2011 | Williams et al. | |
| 8,045,696 B1 | 10/2011 | Taylor et al. | |
| 8,155,280 B1 | 4/2012 | Or-Bach et al. | |
| 8,199,886 B2 | 6/2012 | Calahan et al. | |
| 8,229,099 B2 | 7/2012 | LaCroix et al. | |
| 8,265,248 B2 | 9/2012 | Raghav et al. | |
| 8,265,262 B2 | 9/2012 | Pan | |
| 8,300,559 B2 * | 10/2012 | Ezell | 370/261 |
| 2001/0000458 A1 | 4/2001 | Shtivelman et al. | |
| 2002/0046030 A1 * | 4/2002 | Haritsa et al. | 704/256 |
| 2003/0147514 A1 | 8/2003 | Ryu et al. | |

(Continued)

OTHER PUBLICATIONS

File Wrapper corresponding to U.S. Appl. No. 13/632,819.

*Primary Examiner* — Fan Tsang
*Assistant Examiner* — Akelaw Teshale
(74) *Attorney, Agent, or Firm* — Leydig, Voit & Mayer, Ltd.

(57) ABSTRACT

A system and method are provided for allowing a user to consent to call recording. A user is prompted to make a recording preference. The recording preference is stored in a table indexed by UCID (universal call ID) or as part of a UUI (user-to-user information) field of the call. A recording module and/or a compliance manager, both associated with a call center, are configured to record or not record the call based on the recording preference. The recording preference can be enforced on incoming and outgoing calls to and from the call center. Advantageously, the user's recording preference is enforced throughout the call, regardless of how the call is routed/transferred within the call center.

14 Claims, 9 Drawing Sheets

(56) References Cited

U.S. PATENT DOCUMENTS

| | | | |
|---|---|---|---|
| 2007/0269036 A1* | 11/2007 | Bates et al. | 379/212.01 |
| 2010/0110938 A1 | 5/2010 | Gavish et al. | |
| 2010/0144350 A1 | 6/2010 | Walter et al. | |
| 2010/0278316 A1 | 11/2010 | Beauregard et al. | |
| 2011/0164737 A1* | 7/2011 | Bates et al. | 379/142.01 |
| 2011/0211679 A1 | 9/2011 | Mezhibovsky et al. | |
| 2011/0287748 A1 | 11/2011 | Angel et al. | |
| 2013/0034025 A1* | 2/2013 | Simoes et al. | 370/259 |

\* cited by examiner

| UCID | Recording Preference | Bit |
|---|---|---|
| 0001 | Do not record | 0 |
| 0002 | Record | 1 |
| 0003 | Record | 1 |
| 0004 | [Not selected] | null |
| ... | ... | ... |

FIG. 5

Agent Interface

Caller Name: John Doe
Phone: (415) 555-2424
Call Type: Billing Inquiry

Recording?: DO NOT RECORD
(User has denied consent)

FIG. 9A

Agent Interface

Caller Name: John Doe
Phone: (415) 555-2424
Call Type: Billing Inquiry

Recording?: OK TO RECORD
[Call is being recorded]
[Time: 00m:24s]

FIG. 9B

Agent Interface

Caller Name: John Doe
Phone: (415) 555-2424
Call Type: Billing Inquiry

Recording?: (?) UNKONWN (Prompt user to consent to recording)

SYSTEM AND METHOD FOR ENFORCING A RECORDING PREFERENCE

BACKGROUND

Many call centers record customer calls for quality and training purposes. However, recording customer calls may, in some cases, infringe on the customer's privacy. Certain call centers have even been subjected to lawsuits for recording customer calls, alleging violations of privacy and wire tapping regulations. In conventional call centers, there is typically no way for the customer to deny consent to record the call.

Another problem often encountered by call center customers is that when a call is transferred from one agent to the next, the customer oftentimes needs to provide the same information to the next agent. This process is inefficient and can be become annoying to the caller when the caller must repeatedly provide the same information to multiple agents.

Thus, such conventional systems often result in unsatisfactory user experiences, making them unreliable and undesirable. Accordingly, there remains a need in the art for a secure and efficient way to enforce customer recording preferences and eliminate the need to provide the same information multiple times during a call.

SUMMARY

One embodiment provides a method for imposing a recording preference of a telephony call placed to a call center. The method includes prompting a user as to consent to recording the telephony call; receiving a preference response to the prompt; transmitting the preference response to a table indexed by UCID (universal call ID) and storing the preference response in the table; routing the telephony call to a first agent of the call center via a PBX (private branch exchange); determining whether to record the call with the first agent based on the preference response stored in the table; routing the telephony call from the first agent to a second agent via the PBX; and determining whether to record the call with the second agent based on the preference response stored in the table.

Another embodiment provides a method for imposing a recording preference of a telephony call placed to a call center. The method includes receiving a call from a user at the call center with includes a PBX (private branch exchange; prompting the user for instructions regarding recording the call by the call center; receiving the instructions from the user; storing information into a UUI (user-to-user information) field associated with the call indicating the user's preference regarding the recording of the call; and routing the call via the PBX while enforcing the user's preference indicated by the stored information by communicating the preference to each destination of the routing.

Another embodiment provides a system for imposing a recording preference. The system includes: user equipment for initiating a call to a call center; an IVR (interactive voice response) system at the call center configured to prompt the user equipment for a recording preference regarding recording of the call, and receive the recording preference from the user equipment; a switching network at the call center for routing the call; a compliance manager configured to enforce the recording preference throughout the call regardless of how the call is routed; and a recording vendor in communication with the compliance manager to record the call based on the recording preference.

Another embodiment provides a method for imposing a recording preference of a telephony call placed from a call center to a customer (i.e., outbound call). The method includes establishing a three-way telephony call between an agent of the call center, a user, and an IVR (interactive voice response) system; prompting the user as to consent to recording the telephony call; receiving a preference response to the prompt; transmitting the preference response to a table indexed by UCID (universal call ID) and storing the preference response in the table; dropping the IVR system from the three-way telephony call; and determining whether to record the call with the agent based on the preference response stored in the table.

Another embodiment provides a method for imposing a recording preference of a telephony call placed from a call center. The method includes establishing a three-way telephony call between an agent of the call center, a user, and an IVR (interactive voice response) system; prompting the user for instructions regarding recording the call by the call center; receiving the instructions from the user; storing information into a UUI (user-to-user information) field associated with the call indicating the user's preference regarding the recording of the call; dropping the IVR system from the three-way telephony call; and enforcing the user's preference indicated by the stored information.

Another embodiment provides a system for imposing a recording preference. The system includes: an agent device configured to place an outgoing call from an agent of a call center to a user, wherein the agent device includes a CTI (computer telephone integration) system configured to present a recording preference of the user to the agent via an agent interface; user equipment for receiving the call placed by the agent device; a compliance manager configured to enforce the recording preference; and a recording vendor in communication with the compliance manager to record the call based on the recording preference and an agent input received from the agent device to start or stop recording.

BRIEF DESCRIPTION OF THE DRAWINGS

FIG. 5 is an example of a table for recording the user's recording preference with a UCID of the call, according to one embodiment.

FIGS. 9A-9C are examples of agent interfaces presented to the agent on an agent device, according to various embodiments.

DETAILED DESCRIPTION

Figure 1:
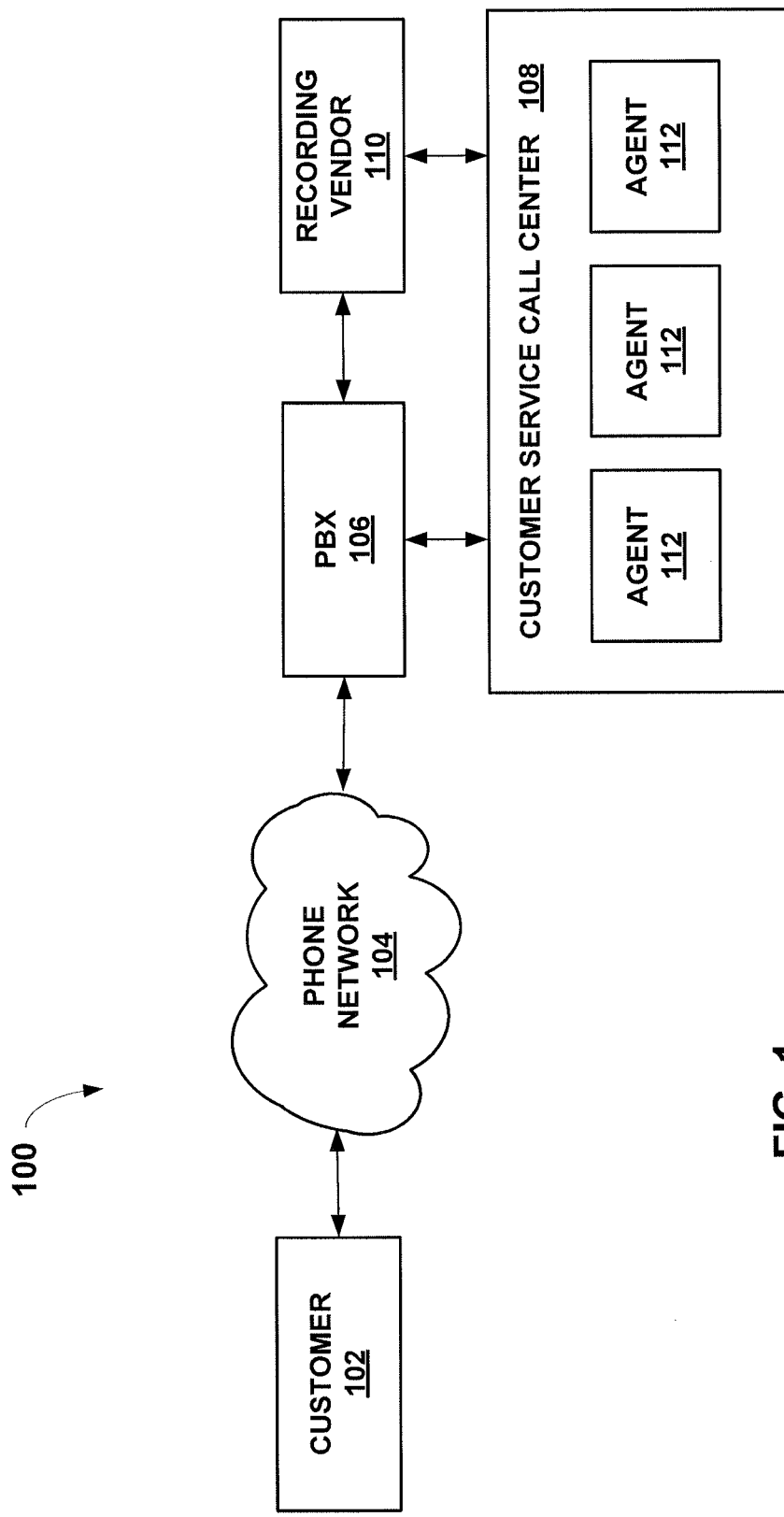
FIG. 1 is a schematic diagram of an example communication environment, according to one embodiment.

Some embodiments of the disclosure are directed to a system and method for allowing a user to consent to call recording when calling a customer service call center. When a user calls the call center, an IVR (interactive voice response) system prompts the user to provide a recording preference as to whether the user would like to consent to the call being recorded.

In a first embodiment, the IVR transmits the user's response to a compliance manager that records the user's response in a table indexed by UCID (universal call ID). The compliance manager is a software module that resides at the call center. In one embodiment, the compliance manager is a stand-alone application that can interface with a PBX (private branch exchange) via an API (application programming interface) of the PBX. In another embodiment, the compliance manager is incorporated into a PBX (private branch exchange), also within the call center. In another embodiment, the compliance manager is incorporated into software executing on a computing device operated by a customer service agent at the call center. In yet another embodiment, the software executing on the computing device operated by the customer service agent at the call center controls a stand-alone compliance manager application.

The UCID is a unique identifier that allows a call to be identified as it travels between switches or adjuncts in a private network until the call is terminated. A recording vendor/module is configured to record the calls. In one embodiment, the recording module is provided by a third-party software vendor and is incorporated into the software operated by the call center. In some embodiment, the recording module inquires with the compliance manager as to whether recording is allowed. The compliance manager then performs a look-up in the table by UCID to determine whether the call should be recorded and responds to the recording module. Also, in some embodiments, the compliance manager periodically checks the calls that are being recorded by the recording module to ensure that only the calls with a UCID corresponding to a user that consented to recording are being recorded.

In a second embodiment, after the IVR receives the user's recording preference in response to the prompt, the IVR places an indicator corresponding to the user's response in the UUI (user-to-user) information associated with the call. The UUI comprises metadata associated with the call and allows specific information pertaining to the call to pass from one agent to another as the call is transferred within the network. The recording module may check the UUI field of the call before recording the call. In some embodiments, the compliance manager also periodically checks the calls that are being recorded by the recording vendor to ensure that only the calls with a UUI filed corresponding to a user that consented to recording are being recorded.

In further embodiments, an agent can place an outgoing call to a user. An IVR system can be conferenced-in to the call (i.e., a three-way call between the agent, the user, and the IVR system). The IVR system prompts the user as to whether the user would like to consent to recording. When the agent places an outgoing call to the user, the user's recording preference can be identified via the UCID, as described above, or via the UUI field, as also described above. Once the IVR system takes the appropriate action in response to the user's recording preference, the IVR system then drops out of the three-way call and the call continues between the agent and customer. The call is then recorded if the user has consented to recording.

In one embodiment, if the user does not provide a response to the prompt, then the call is automatically not recorded by default. In another embodiment, if the user does not provide a response to the prompt, then the call is automatically recorded by default.

Figure 2:
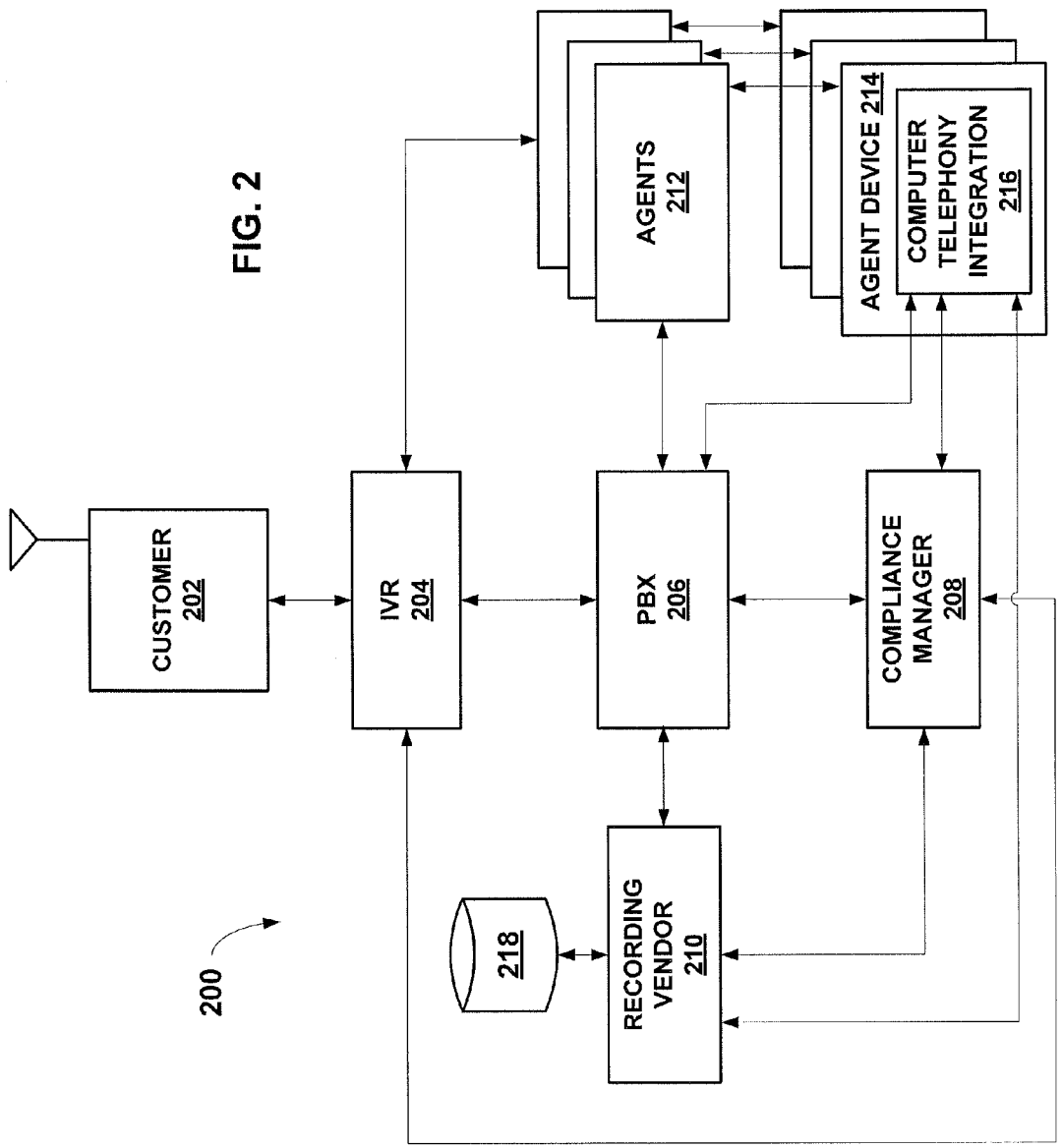
FIG. 2 is a schematic diagram of an example communication environment including a compliance manager, according to one embodiment.
Figure 3:
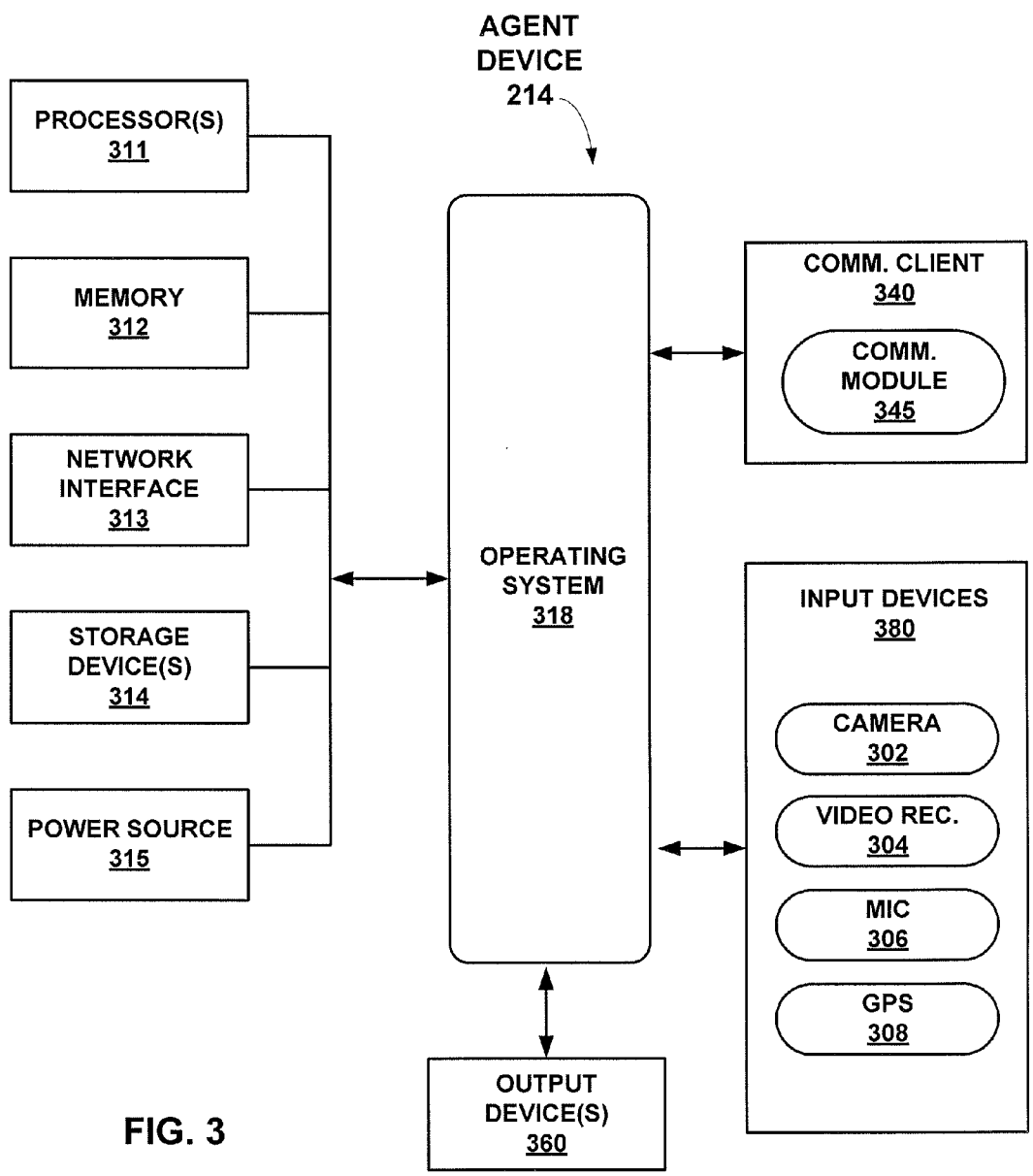
FIG. 3 is a schematic diagram of the arrangement of applications on a computing device configured to enforce a customer's recording preference, according to one embodiment.

Turning to the drawings and referring to FIGS. 1-3, a communication environment is presented as an example environment for the setting a recording preference and does not imply any limitation regarding the use of other communication environments. In FIG. 1, the communication environment 100 includes a customer device 102, a phone network 104, a PBX 106, a customer service call center 108, and a recording vendor 110.

Examples of customer device 102 include, but are not limited to, portable, mobile, and/or stationary devices such as landline telephones, mobile telephones (including mobile phones with advance computing capabilities, or "smartphones"), conference call equipment, laptop computers, tablet computers, desktop computers, personal digital assistants (PDAs), portable gaming devices, portable media players, e-book readers, Internet-enabled televisions, or Internet-enabled appliances, among others.

In the embodiment illustrated by FIG. 1, the customer device 102 communicates with the customer service call center 108 via phone network 104. The phone network 104 may be any type of network for voice communication, including a cellular phone network, a POTS (Plain Old Telephone Service) network, a conference call network, among others. In some embodiments, the phone network 104 supports video in addition to audio.

In some embodiments, the customer device 102 of FIG. 1 includes one or more installed applications, a communications client, output devices (e.g., a display), and input devices (e.g., keyboard, mouse, touch screen, video recording device, audio recording device, GPS (global positioning module), photo capture device, etc.). In some embodiments, a customer device 102 may act as both an output device and an input device. Examples of installed applications are a web browser application or a smartphone application (or "app"). Applications provide the customer device 102 with a variety of functionalities. Examples include social media functionality, web browsing capabilities, calendars, contact information, games, document processing, photo editing, document sharing, among others. Applications employ the output devices to display information at a graphical user interface (GUI).

The PBX 106 is a telephone exchange that that serves a particular business or office. PBX 106 makes connections among the internal telephones of a private organization, e.g., a customer service call center 108, and also connects the internal telephones to the phone network 104, e.g., the public switched telephone network (PSTN).

The customer service call center 108 is coupled to the PBX 106 and includes a plurality of agents 112. The call center 108 is typically a centralized, or virtualized, office used for the purpose of receiving and transmitting a large volume of requests by telephone. In some embodiments, the agents 112 may be trained to handle particular issues. When a call reaches an agent 112 that is not qualified to handle the call because the agent is not trained to support the issue, the call is typically transferred to another agent 112 qualified to support the issue.

A recording module 110 is configured to record the calls placed to the call center 108. In one embodiment, the recording module 110 is provided by a third-party software vendor and is sold to the call center 108. The call center 108 incorporates the recording module 110 into the software of the call center 108. As described in greater detail herein, the recording module 110 and the call center 108 are configured to enforce the customer's call recording preferences.

FIG. 2 is a schematic diagram of an example communication environment 200 including a compliance manager 208, according to one embodiment. As shown, the communication environment 200 includes a customer 202 (or "user"), an IVR (interactive voice response) 204 system, a PBX 206, a compliance manager 208, a recording vendor 210, agents 212, agent devices 214, and a storage device 218.

In one embodiment, the IVR 204, the PBX 206, the compliance manager 208, the recording vendor 210, the agents 212, the agent devices 214, and the storage device 218 are collectively considered to be "the call center." The customer 202 places a call to a phone number, such as a phone number associated with the call center. The call is initially routed to an IVR 204. An IVR 204 is a system that allows a computer to interact with humans through the use of voice and DTMF (dual-tone multi-frequency) tones input via a keypad. The IVR 204 allows customers to interact with the call center's system via a telephone keypad or by speech recognition. IVR 204 prompts the user with prerecorded or dynamically generated audio to further direct users on how to proceed. An IVR 204 is typically used to control functions where the interface can be broken down into a series of stages.

In some instances, the customer 202 is able to achieve the desired result using only the IVR 204 and the predefined prompts. In other instances, the call needs to be routed to an agent 212 who further assists the customer 202. The agent 212 can be a member of the call center. Each agent 212 operates an agent device 214, such as a computer, having installed thereon a computer telephone integration (CTI) application 216. CTI describes any technology that allows interactions on a telephone and a computer to be integrated or coordinated. The term CTI is predominantly used to describe desktop-based interaction for helping users be more efficient, although the term can also refer to server-based functionality, such as automatic call routing. In one embodiment, the CTI 216 embodies both the agent device 214 and the compliance manager 208 and provides an interface to PBX 206.

As described above, the call sometimes needs to be transferred between two agents 212. Transferring the call can be achieved via the PBX 206.

Recording module 210 is configured to record calls and to store the recorded calls in a storage device 218. Storage device 218 is configured for long-term storage of information. In some examples, storage device 218 includes non-volatile storage elements. Non-limiting examples of non-volatile storage elements include magnetic hard disks, optical discs, floppy discs, flash memories, or forms of electrically programmable memories (EPROM) or electrically erasable and programmable (EEPROM) memories. In one embodiment, the recording vendor 210 receives audio data from the PBX 206 and also receives recording compliance information and preference data from the compliance manager 208.

A compliance manager 208 is configured to enforce the call recording preference of the customer 202. The compliance manager 208 is a software module that resides at the call center. In one embodiment, the compliance manager 208 is incorporated into PBX 206. In another embodiment, the compliance manager 208 is incorporated into software executing on the agent device 214 operated by the customer service agent 212.

As described herein, some embodiments of the disclosure allow the customer 202 to consent to or deny consent to having the call recorded. The customer's recording preference is configured to be enforced throughout the call, even after the call has been transferred to a different agent. To implement the recording preference feature, the IVR 204 prompts the customer 202 with a recorded message as to whether the customer 202 would like to consent to recording.

In a first embodiment, the IVR 204 transmits the customer's response to the compliance manager 208 that stores the user's response in a table indexed by UCID (universal call ID). The UCID is a unique identifier for the call that allows a call to be identified as the call travels between switches or adjuncts in a private network until the call is terminated. In one embodiment, before the recording module 210 begins to record a call, the recording module 210 inquires with the compliance manager 208 as to whether recording is allowed. The compliance manager 208 then performs a look-up in the table by UCID to determine whether the call should be recorded and responds to the recording module 210. Also, in some embodiments, the compliance manager 208 periodically checks the calls that are being recorded by the recording module 210 to ensure that only the calls with a UCID corresponding to consent to record the call are being recorded.

In a second embodiment, after the IVR 204 receives the user's recording preference in response to the prompt, the IVR 204 places an indicator corresponding to the user's response in the UUI (user-to-user) information associated with the call. The UUI comprises metadata associated with the call and allows specific information pertaining to the call to pass from one agent 212 to another agent 212 as the call is transferred within the call center. The recording module 210 may check the UUI field of the call before recording the call. In some embodiments, the compliance manager 208 periodically checks the calls that are being recorded by the recording vendor 210 to ensure that only the calls with a UUI filed corresponding to consent to record the call are being recorded.

In further embodiments, an agent 212 can place an outgoing call to a customer 202. IVR 204 can be conferenced-in to the call (i.e., a three-way call between the agent 212, the customer 202, and IVR 204). IVR 204 prompts the customer 202 as to whether the customer 202 would like to consent to recording. The user's recording preference is identified via the UCID, as described above, or via the UUI field, as also described above. Once the IVR 204 takes the appropriate action in response to the user's recording preference, the IVR 204 drops out of the three-way call and the call continues between the agent 212 and customer 202. The call is then recorded if the customer 202 has consented to recording. In one embodiment, initiating the three-way call is done automatically when a call is placed by the agent 212. In another embodiment, the three-way call is manually initiated by the agent 212 once the agent 212 initiates call recording.

In one embodiment, a graphical user interface (GUI) on the agent device 214 allows the agent 212 to view an indicator that corresponds to the customer's recording preference. For example, the GUI may indicate that the customer has consented to recording, denied consent to recording, or has not yet made a selection. If the customer has not made a selection, the GUI provides a mechanism for a prompt to be generated by the IVR 204 to ask for the user's preference. Alternatively, the agent 212 may verbally ask the customer 202 of the customer's recording preference before assisting the customer 202.

Referring now to FIG. 3, one particular example of computing device 300 configured to enforce a customer's recording preference is illustrated. Many other embodiments of the computing device 300 may also be used. According to various embodiments, the computing device 300 may be the agent device 214 operated by agent 212 and/or the computing device that executes the compliance manager 208.

In the illustrated embodiment of FIG. 3, the computing device 300 includes one or more processor(s) 311, memory 312, a network interface 313, one or more storage devices 314, a power source 315, output device(s) 360, and input device(s) 380. The computing device 300 also includes an operating system 318 and a communications client 340 that are executable by the client. Each of components 311, 312, 313, 314, 315, 360, 380, 318, and 340 is interconnected physically, communicatively, and/or operatively for inter-component communications in any operative manner.

As illustrated, processor(s) 311 are configured to implement functionality and/or process instructions for execution within computing device 300. For example, processor(s) 311 execute instructions stored in memory 312 or instructions stored on storage devices 314. Memory 312, which may be a non-transient, computer-readable storage medium, is configured to store information within computing device 300 during operation. In some embodiments, memory 312 includes a temporary memory, area for information not to be maintained when the computing device 300 is turned OFF. Examples of such temporary memory include volatile memories such as random access memories (RAM), dynamic random access memories (DRAM), and static random access memories (SRAM). Memory 312 maintains program instructions for execution by the processor(s) 311.

Storage devices 314 also include one or more non-transient computer-readable storage media. Storage devices 314 are generally configured to store larger amounts of information than memory 312. Storage devices 314 may further be configured for long-term storage of information. In some examples, storage devices 314 include non-volatile storage elements. Non-limiting examples of non-volatile storage elements include magnetic hard disks, optical discs, floppy discs, flash memories, or forms of electrically programmable memories (EPROM) or electrically erasable and programmable (EEPROM) memories.

The computing device 300 uses network interface 313 to communicate with external devices via one or more networks, such a data network and/or phone network. Network interface 313 may be a network interface card, such as an Ethernet card, an optical transceiver, a radio frequency transceiver, or any other type of device that can send and receive information. Other non-limiting examples of network interfaces include wireless network interface, Bluetooth®, 3G and WiFi® radios in mobile computing devices, and USB (Universal Serial Bus). In some embodiments, the computing device 300 uses network interface 313 to wirelessly communicate with an external device, a mobile phone, or other networked computing device.

The computing device 300 includes one or more input devices 380. Input devices 380 are configured to receive input from a user through tactile, audio, video, or other sensing feedback. Non-limiting examples of input device 380 include a presence-sensitive screen, a mouse, a keyboard, a voice responsive system, camera 302, a video recorder 304, a microphone 306, a GPS module 308, or any other type of device for detecting a command from a user or sensing the environment. In some examples, a presence-sensitive screen includes a touch-sensitive screen.

One or more output devices 360 are also included in computing device 300. Output devices 360 are configured to provide output to a user using tactile, audio, and/or video stimuli. Output devices 360 may include a display screen (part of the presence-sensitive screen), a sound card, a video graphics adapter card, or any other type of device for converting a signal into an appropriate form understandable to humans or machines. Additional examples of output device 360 include a speaker, a cathode ray tube (CRT) monitor, a liquid crystal display (LCD), or any other type of device that can generate intelligible output to a user. In some embodiments, a device may act as both an input device and an output device.

The computing device 300 includes one or more power sources 315 to provide power to the computing device 300. Non-limiting examples of power source 315 include single-use power sources, rechargeable power sources, and/or power sources developed from nickel-cadmium, lithium-ion, or other suitable material.

The computing device 300 includes an operating system 318. The operating system 318 controls operations of the components of the computing device 300. For example, the operating system 318 facilitates the interaction of communications client 340 with processors 311, memory 312, network interface 313, storage device(s) 314, input device 380, output device 360, and power source 315.

As also illustrated in FIG. 3, the computing device 300 includes communications client 340. Communications client 340 includes communications module 345. Each of communications client 340 and communications module 345 includes program instructions and/or data that are executable by the computing device 300. For example, in one embodiment, communications module 345 includes instructions causing the communications client 340 executing on the computing device 300 to perform one or more of the operations and actions described in the present disclosure. In some embodiments, communications client 340 and/or communications module 345 form a part of operating system 318 executing on the computing device 300.

Figure 4:
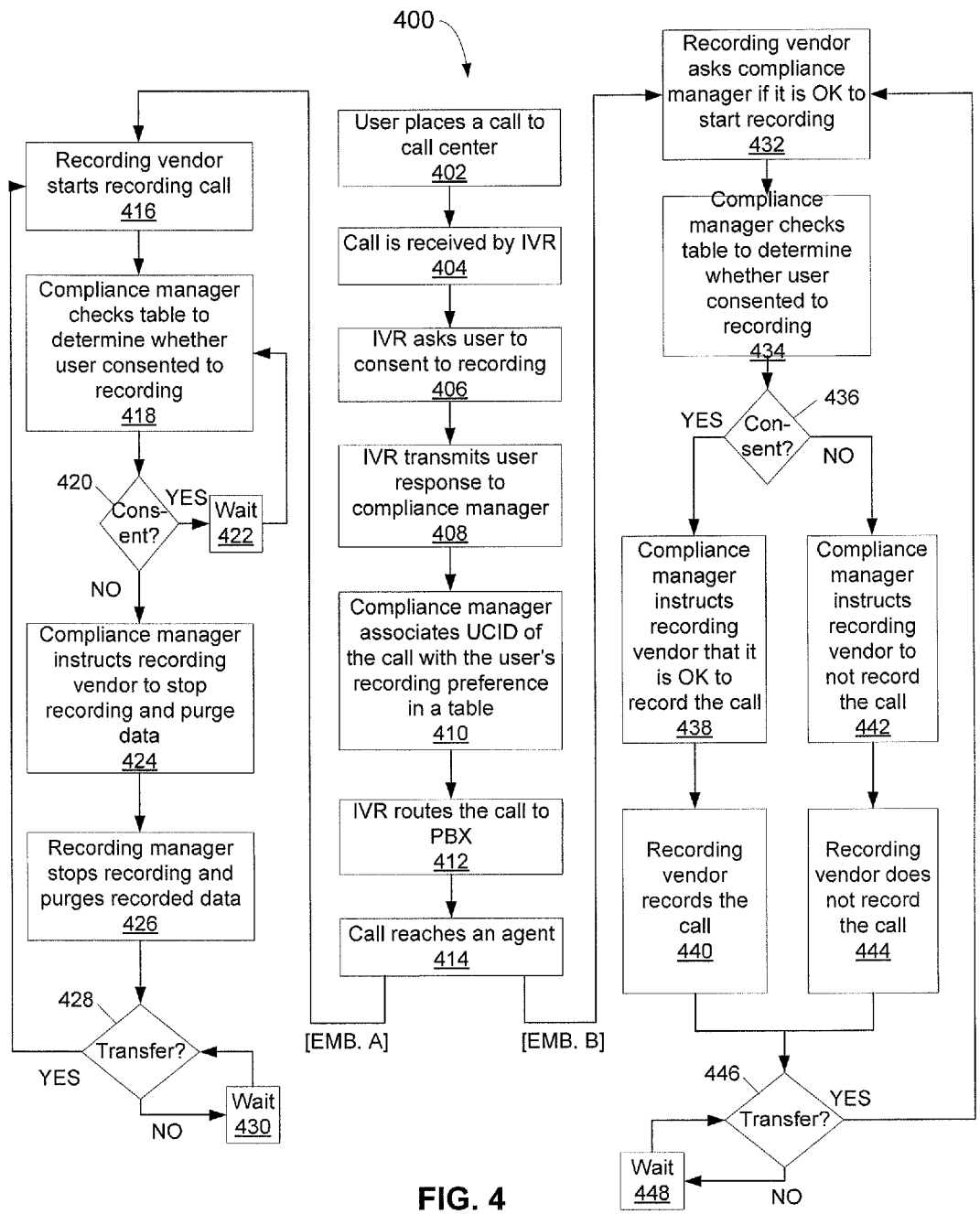
FIG. 4 is a flowchart illustrating enforcing a user's recording preference via a UCID (universal call ID), according to various embodiments.

FIG. 4 is a flowchart illustrating enforcing a user's recording preference via a UCID (universal call ID), according to various embodiments. As shown, the method 400 begins at stage 402, where a user places a call to a call center. At stage 404, the call is received by an IVR. At stage 406, the IVR asks the user to consent to the recording. At stage 408, the IVR transmits the user response to the compliance manager.

At stage 410, the compliance manager associates the UCID of the call with the user's recording preference in a table. FIG. 5 is an example of a table for recording the user's recording preference with a UCID of the call, according to one embodiment. As shown, one column in the table lists the UCID of calls presently being handled by the call center. A second column indicates the corresponding user recording preference, such as "Do not record" or "Record." In some cases, the user may not have made a response to consent or deny consent to recording. In such cases, the user's recording preference may be listed as "Not selected." Additionally, in some embodiments, the user's recording preference is recorded as a single bit in the table, with "1" corresponding to "Record," "0" corresponding to "Do not record," and "null" corresponding to "Not selected."

Referring back to FIG. 4, at stage 412, the IVR routes the call to a PBX and, at stage 414, the call eventually reaches an agent. From stage 414, two different embodiments of the disclosure are described. One embodiment is labeled in FIG. 4 as embodiment A (i.e., "EMB. A") and the other is labeled in FIG. 4 as embodiment B (i.e., "EMB. B"). From stage 414, either one of embodiments A or B can be performed.

Assuming that embodiment A is performed, the method proceeds to stage 416, where the recording vendor starts recording the call. In this embodiment, the recording vendor does not perform any type of check to determine whether the call should be recorded or not. At stage 418, the compliance manager checks the table to determine whether the user consented to the recording. At stage 420, if compliance manager determines that the UCID of the call is associated with a table entry indicating that the user has consented to recording, then the method 400 proceeds to stage 422, where the compliance manager waits for a predetermined amount of time. For example, the compliance manager may wait for 1 minute. Then, the method 400 returns to stage 418, described above. In this manner, the compliance manager is periodically checking the calls being recorded by the recoding vendor to ensure that only those calls for which the user has consented to recording are being recorded. The recording vendor itself does perform any type of checking for recording preference.

Referring back to stage 420, if compliance manager determines that the UCID of the call is associated with a table entry indicating that the user has denied consent to recording, then the method 400 proceeds to stage 424. At stage 424, the compliance manager instructs the recording vendor to stop recording the call and to purge the recorded data. At stage 426, the recording vendor stops recording and purges the recorded data.

At stage 428, the compliance manager determines whether the call has been transferred to another agent. The determination at stage 428 may be performed by comparing an agent identifier associated with the agent assisting the customer at a particular point in time, storing the agent identifier, and then comparing the agent identifier associated with the agent assisting the customer at a later point it time with the previously stored agent identifier.

If the compliance manager determines that the call has not been transferred to another agent, then the method 400 proceeds to stage 430, where the compliance manager waits for a predetermined amount of time. For example, the compliance manager may wait for 1 minute. Then, the method 400 returns to stage 428, where the compliance manager again checks to determine whether the call has been transferred.

If, at stage 428, the compliance manager determines that the call has been transferred to another agent, then the method 400 returns to stage 416, described above.

In embodiment A of FIG. 4 (i.e., stages 416-430), the recording vendor starts recording the call each time that the call is transferred to another agent. The compliance manager, however, is continuously checking the calls being recorded by the recording vendor to ensure that only those calls for which the customer has consented to recording remain being recorded. If the compliance manager determines that the call is being recorded, but the user has denied consent, then the compliance manager instructs the recording vendor to stop recording and purge any recorded data.

Referring back to stage 414, embodiment B is now described. From stage 414, the method 400 proceeds to stage 432, where the recording vendor asks the compliance manager if it is OK to start recording before initializing recording of the call. This stage is different from stage 416 (i.e., from embodiment A) since now the recording vendor, by way of inquiry to the compliance manager, is performing the recording preference check.

At stage 434, the compliance manager checks the table in response to the inquiry from the recording vendor to determine whether the user has consented to the recording.

If, at stage 436, the compliance manager determines that the user denied consent to recording (i.e., by checking the UCID in the table), then the method 400 proceeds to stage 442. At stage 442, the compliance manager instructs the recording vendor to not record the call. At stage 444, the recording vendor does not record the call.

If, at stage 436, the compliance manager determines that the user has not denied consent (or has specifically consented) to recording, then the method 400 proceeds to stage 438. At stage 438, the compliance manager instructs the recording vendor that it is OK to record the call. At stage 440, the recording vendor records the call. In other embodiments, the compliance manager may determine that if the user has not made a selection as to whether to give consent or deny consent to recording, then by default the call is not recorded.

From stages 440 and 444, the method 400 proceeds to stage 446. At stage 446, the compliance manager determines whether the call has been transferred to another agent. If the compliance manager determines that the call has not been transferred to another agent, then the method 400 proceeds to stage 448, where the compliance manager waits for a predetermined amount of time. For example, the compliance manager may wait for 1 minute. Then, the method 400 returns to stage 446, where the compliance manager again checks to determine whether the call has been transferred.

If, at stage 446, the compliance manager determines that the call has been transferred to another agent, then the method 400 returns to stage 432, described above.

In embodiment B of FIG. 4 (i.e., stages 432-448), the recording vendor does not start recording the call until the recording vendor has inquired with the compliance manager as to whether it is OK to record the call based on the user's preference. In some embodiments (not shown), the compliance manager may also periodically check the calls being recorded by the recording vendor in embodiment B, as an added security measure to further ensure compliance with the user's recording preference.

Figure 6:
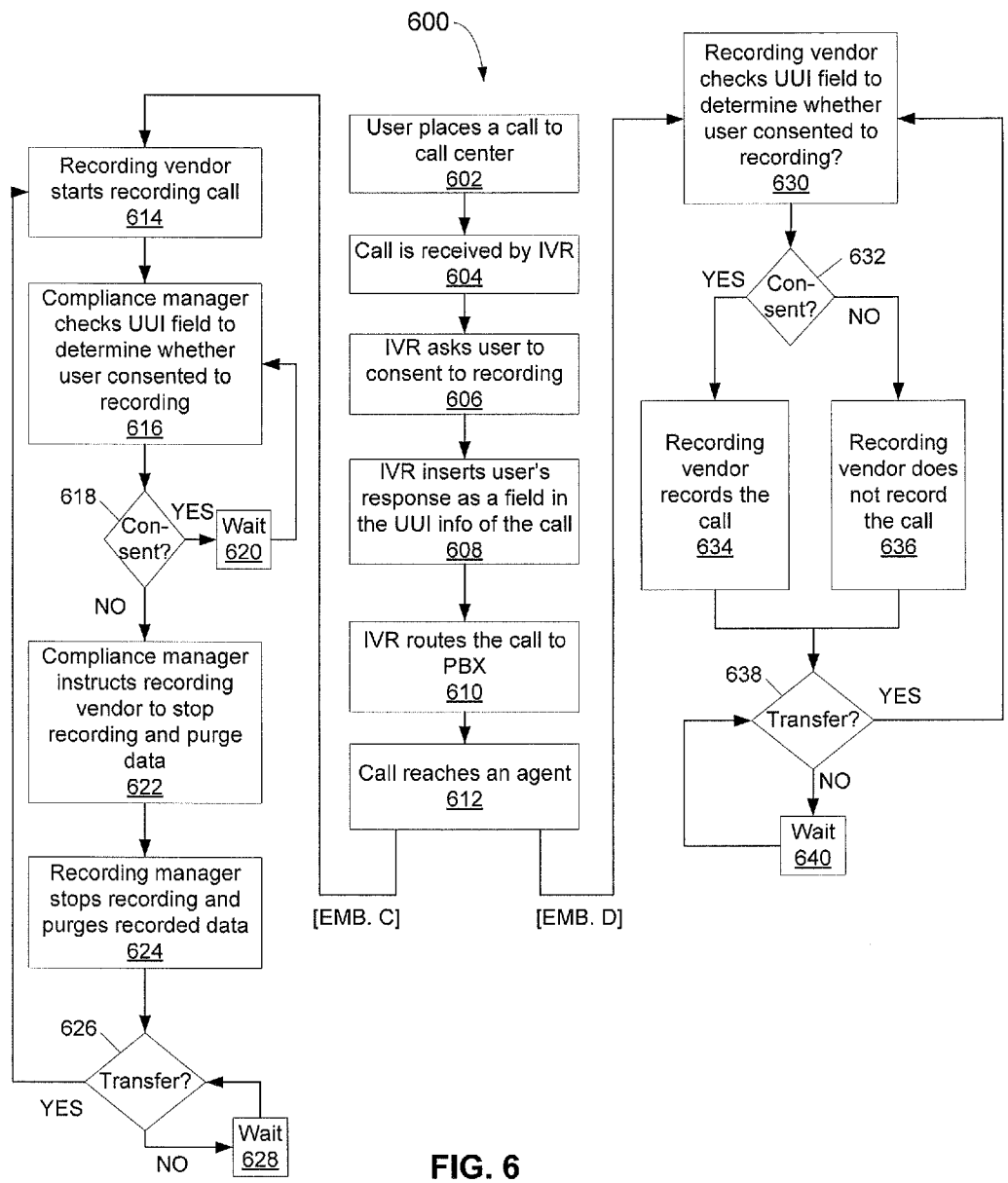
FIG. 6 is a flowchart illustrating enforcing a user's recording preference via a UUI (user-to-user information) field of a call, according to various embodiments.

FIG. 6 is a flowchart illustrating enforcing a user's recording preference via a UUI (user-to-user information) field of a call, according to various embodiments. As shown, the method 600 begins at stage 602, where the user places a call to the call center. At stage 604, the call is received by an IVR. At stage 606, the IVR asks the user to consent to the recording. At stage 608, the IVR inserts the user's response as a field in the UUI information of the call. The UUI comprises metadata associated with the call and allows specific information pertaining to the call to pass from one agent to another as the call is transferred within the network via the PBX. For example, as the user responds to prompts from the IVR, the responses may be placed into the appropriate fields in the UUI. Once such response is the user's recording preference.

Figure 7:
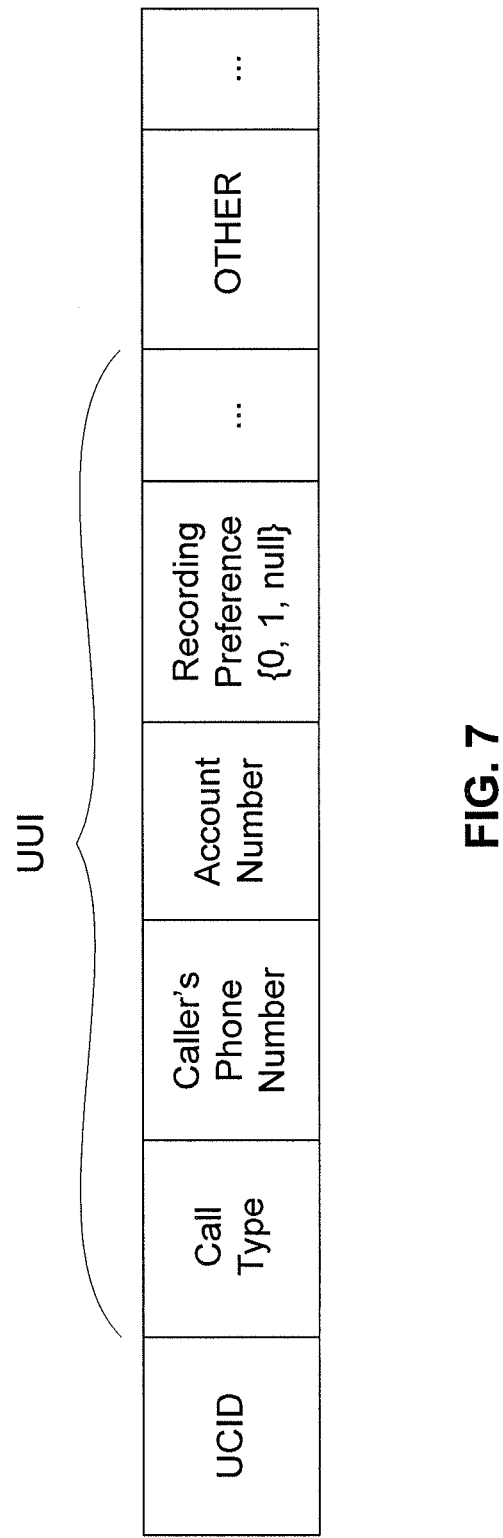
FIG. 7 is an example of data associated with a call, according to one embodiment.

FIG. 7 is an example of data associated with a call, according to one embodiment. As shown, the data includes a UCID (universal call ID), UUI data, and/or other data. The UUI data may include a call type, a caller's phone number, an account number, a recording preference, or other information. In one example, the recording preference is a single bit that can be set to "1" (e.g., record), "0" (e.g., do not record), or null (e.g., no selection has been made). The data shown in FIG. 7 travels with the call as the call is transferred between agents in a call center via the PBX.

Referring back to FIG. 6, at stage 610, the IVR routes the call to the PBX. At stage 612, the call reaches an agent. From stage 612, two different embodiments of the disclosure are described. One embodiment is labeled in FIG. 6 as embodiment C (i.e., "EMB. C") and the other is labeled in FIG. 6 as embodiment D (i.e., "EMB. D"). From stage 612, either one of embodiments C or D can be performed.

Assuming that embodiment C is performed, at stage 614, the recording vendor starts recording the call. In this embodiment, the recording vendor does not perform any type of check to determine whether the call should be recorded or not. At stage 616, the compliance manager checks the UUI field of the call to determine whether the user consented to the recording. At stage 618, if compliance manager determines that the UUI of the call indicates that the user has consented to recording, then the method 600 proceeds to stage 620, where the compliance manager waits for a predetermined amount of time. For example, the compliance manager may wait for 1 minute. Then, the method 600 returns to stage 616, described above. In this manner, the compliance manager is periodically checking the calls being recorded by the recoding vendor to ensure that only those calls for which the user has consented to recording are being recorded. The recording vendor itself does perform any type of checking for recording preference.

Referring back to stage 618, if compliance manager determines that the UUI of the call indicates that the user has denied consent to recording, then the method 600 proceeds to stage 622. At stage 622, the compliance manager instructs the recording vendor to stop recording the call and purge the recorded data. At stage 624, the recording manager stops recording and purges the recorded data.

At stage 626, the compliance manager determines whether the call has been transferred to another agent. If the compliance manager determines that the call has not been transferred to another agent, then the method 600 proceeds to stage 628, where the compliance manager waits for a predetermined amount of time. For example, the compliance manager may wait for 1 minute. Then, the method 600 returns to stage 626, described above, where the compliance manager again checks to determine whether the call has been transferred.

If, at stage 626, the compliance manager determines that the call has been transferred to another agent, then the method 600 returns to stage 614, described above.

According to embodiment C in FIG. 6 (i.e., stages 614-628), the recording vendor starts recording the call each time that the call is transferred to another agent. The compliance manager, however, is continuously checking the calls being recorded by the recording vendor to ensure that only those calls for which the customer has consented to recording remain being recorded. If the compliance manager determines that the call is being recorded, but the user has denied consent, then the compliance manager instructs the recording vendor to stop recording and purge any recorded data. In some embodiments, embodiment C in FIG. 6 is similar to embodiment A in FIG. 4, with the difference being that in embodiment C, the UUI field is checked for the recording preference, whereas in embodiment A, the UCID is checked in the table for recording preference.

Referring back to stage 612, embodiment D is now described. From stage 612, the method 600 proceeds to stage 630, where the recording vendor checks the UUI field of the call to determine whether the user consented to recording. If, at stage 632, the recording vendor determines that the user denied consent to recording (i.e., by checking the UUI field of the call), then the method 600 proceeds to stage 636. At stage 636, the recording vendor does not record the call.

If, at stage 632, the recording vendor determines that the user has not denied consent (or specifically consented) to recording, then the method 600 proceeds to stage 634. At stage 634, the recording vendor records the call. In other embodiments, the compliance manager may determine that if the user has not made a selection as to whether to give consent or deny consent to recording, then by default the call is not recorded.

From stages 634 and 636, the method 600 proceeds to stage 638. At stage 638, the compliance manager determines whether the call has been transferred to another agent. If the compliance manager determines that the call has not been transferred to another agent, then the method 600 proceeds to stage 640, where the compliance manager waits for a predetermined amount of time. For example, the compliance manager may wait for 1 minute. Then, the method 600 returns to stage 638, where the compliance manager again checks to determine whether the call has been transferred.

If, at stage 638, the compliance manager determines that the call has been transferred to another agent, then the method 600 returns to stage 630, described above.

According to embodiment D in FIG. 6 (i.e., stages 630-640), the recording vendor itself checks the UUI field of the call to determine whether it is OK to record the call based on the user's preference. In some embodiments (not shown), the compliance manager may also periodically check the calls being recorded by the recording vendor in embodiment D as an added security measure to further ensure compliance with the user's recording preference.

Figure 8:
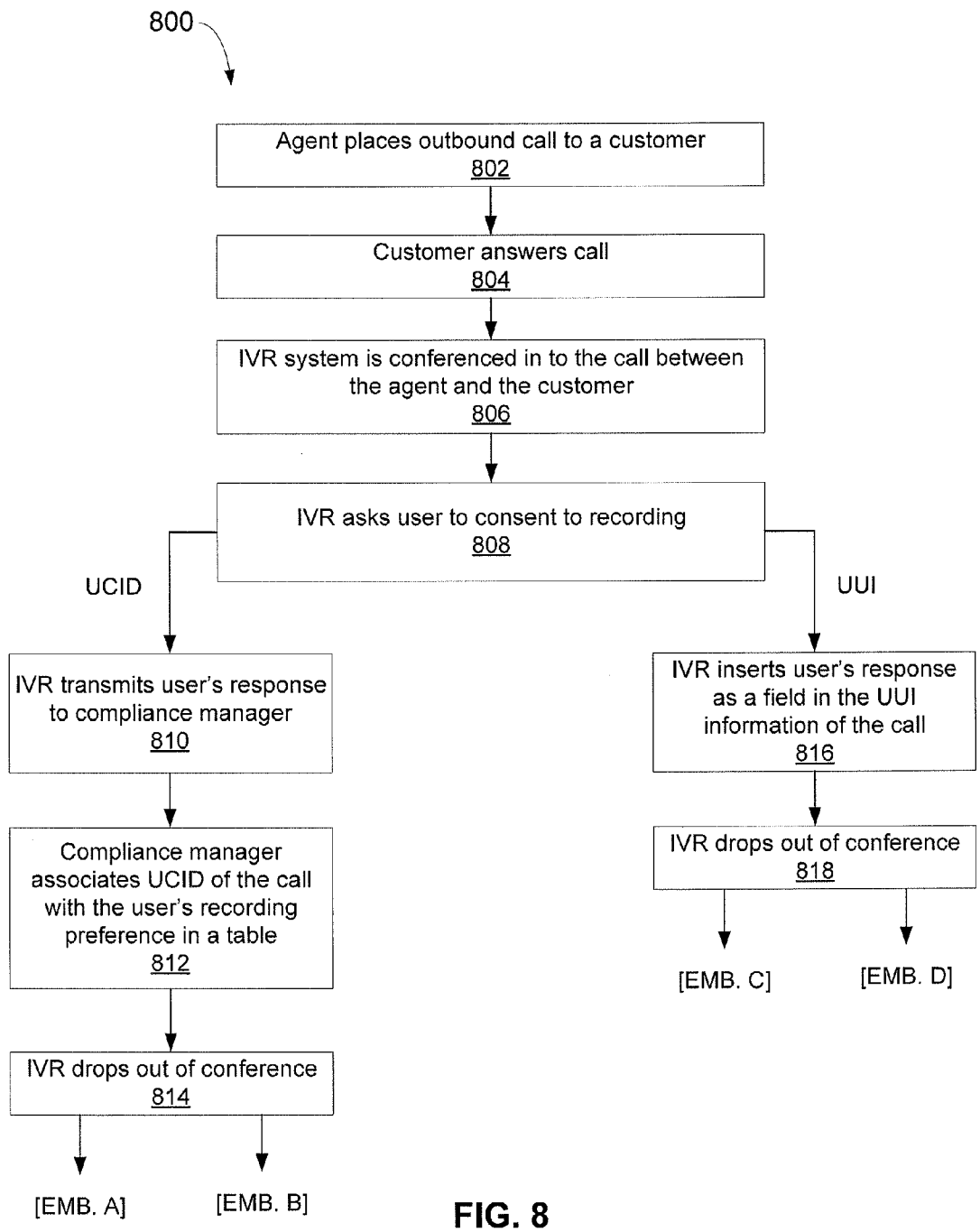
FIG. 8 is a flowchart illustrating enforcing a user's recording preference when an agent places an outgoing call to a customer, according to various embodiments.

FIG. 8 is a flowchart illustrating enforcing a user's recording preference when an agent places an outgoing call to a customer, according to various embodiments. As shown, the method 800 begins at stage 802, where the agent places an outgoing call to a customer. At stage 804, the customer answers the call. At stage 806, an IVR system is conferenced in to the call between the agent and the customer. In this manner, a three-way call is initiated between the agent, the customer, and the IVR.

At stage 808, the IVR prompts/asks the user to consent to the recording. From stage 808, several different embodiments of the disclosure are described. One set of embodiments is labeled in FIG. 8 as UCID embodiments (i.e., "UCID") and the other set of embodiments is labeled in FIG. 8 as UUI embodiments (i.e., "UUI"). From stage 808, either set of embodiments can be performed. In some embodiment, the outbound call is not recorded by default, unless an instruction is received from the agent through the agent device to begin recording the call. The agent may choose to initiate recording based on the user's response to the prompt at stage 808.

Assuming that the UCID embodiments are implemented, the method 800 proceeds to stage 810, where the IVR transmits the user's response to the compliance manager. At stage 812, the compliance manager associates the UCID of the call with the user's recording reference in a table. In one embodiment, stages 810 and 812 in FIG. 8 are similar to stages 408 and 410, respectively, in FIG. 4.

At stage 814, the IVR drops out of the conference. The call then continues with the agent and the customer. From stage 814, two different embodiments of the disclosure are presented. One embodiment is labeled in FIG. 8 as embodiment A (i.e., "EMB. A") and the other is labeled in FIG. 8 as embodiment B (i.e., "EMB. B"). From stage 814, either one of embodiments A or B can be performed. Embodiment A is described in FIG. 4 at stages 416-430 and embodiment B is described in FIG. 4 at stages 432-448.

Referring back to stage 808, assuming that the UUI embodiments are implemented, the method 800 proceeds to stage 816, where the IVR inserts the user's response as a field in the UUI information of the call. In one embodiment, stage 816 in FIG. 8 is similar to stage 608 in FIG. 6.

At stage 818, the IVR drops out of the conference. The call then continues with the agent and the customer. From stage 818, two different embodiments of the disclosure are presented. One embodiment is labeled in FIG. 8 as embodiment C (i.e., "EMB. C") and the other is labeled in FIG. 8 as embodiment D (i.e., "EMB. D"). From stage 818, either one of embodiments C or D can be performed. Embodiment C is described in FIG. 6 at stages 614-628 and embodiment D is described in FIG. 6 at stages 630-640.

FIGS. 9A-9C are examples of agent interfaces presented to the agent on an agent device, according to various embodiments. The agent interfaces shown in FIGS. 9A-9C are presented to the agent in a GUI displayed on a display device of the agent device.

FIG. 9A shows the agent interface when the user has denied consent to recording. As shown, the recording preference 902A indicates not to record the call and indicates that the user has affirmatively denied consent.

FIG. 9B shows the agent interface when the user has consented to for recording. As shown, the recording preference 902B indicates that it is OK to record the call, that the call is being recording, and the recording time.

FIG. 9C shows the agent interface when the user has not made a recording preference selection. As shown, the recording preference 902C indicates that the recording preference is unknown. A button 904 may be provided in the agent interface to prompt the user to consent to recording. If the agent selects the button 904, then the IVR prompts the user with a recorded message to indicate the user's recording preference. The user's response is enforced by way of the compliance manager and/or the recoding vendor, as described in the various embodiments herein.

Accordingly, embodiments of the disclosure provide ways for the user's recording preference to be identified, even after the call has been transferred to a different agent in a call center. In this manner, embodiments of the disclosure help the call center comply with privacy issues associated with recording user phone calls.

In the example embodiments and applications, the various applications can be configured on any distributed or embedded platform within a single physical location or multiple locations. As such, embodiments contemplate that applications, resources, managers, servers, etc. may be joined or separated without diverging from their identities and functions. For example, a "server device" may equivalently include a single server platform or multiple server platforms.

All references, including publications, patent applications, and patents, cited herein are hereby incorporated by reference to the same extent as if each reference were individually and specifically indicated to be incorporated by reference and were set forth in its entirety herein.

For situations in which the systems discussed here collect personal information about users, or may make use of personal information, the users may be provided with an opportunity to control whether programs or features collect personal information (e.g., information about a user's social network, social actions or activities, profession, a user's preferences, or a user's current location), or to control whether and/or how to retrieve content (i.e., recorded voicemails) from a content server (i.e., a voicemail server). In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as, for example, to a city, ZIP code, or state level), so that a particular location of a user cannot be determined. Thus, the user may have control over how information is collected about him or her and used by the systems discussed herein.

The use of the terms "a" and "an" and "the" and similar referents in the context of describing the disclosure (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or example language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

One embodiment of the disclosure may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

Variations of the embodiments disclosed herein may become apparent to those of ordinary skill in the art upon reading the foregoing description. Skilled artisans may employ such variations as appropriate, and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A method for imposing a recording preference of a telephony call placed to a call center, the method comprising:
   prompting a user device to consent to recording the telephony call;
   receiving a preference response to the prompt;
   transmitting the preference response to a table indexed by UCID (universal call ID) and storing the preference response in the table, wherein the UCID is an identifier that corresponds to the telephony call and identifies the telephony call when the telephony call is routed from a first agent device to a second agent device;
   routing the telephony call to the first agent device of the call center via a PBX (private branch exchange);
   determining whether to record the call with the first agent device based on the preference response stored in the table indexed by UCID;
   routing the telephony call from the first agent device to the second agent device via the PBX; and
   determining whether to record the call with the second agent device based on the preference response stored in the table indexed by UCID.

2. The method according to claim 1, further comprising querying the table by UCID to determine whether the telephony call should be recorded.

3. The method according to claim 1, further comprising recording the telephony call until being instructed by a compliance manager module to stop recording.

4. The method according to claim 1, further comprising periodically checking the telephony calls being recorded against the preference responses stored in the table.

5. The method according to claim 4, further comprising instructing a recording module to stop recording the call and to purge recorded data when the telephony call is being recorded but the preference response in the table indicates that the user device has denied consent to recording.

6. The method according to claim 1, wherein preference response is stored in the table as a single bit.

7. A system for imposing a recording preference, the system comprising:
- an IVR (interactive voice response) system at the call center configured to: prompt user equipment configured to initiate and receive calls for a recording preference regarding recording of the call, and receive the recording preference from the user equipment;
- a switching network at the call center for routing the call;
- a compliance manager computing system configured to enforce the recording preference throughout the call regardless of how the call is routed based on an identifier corresponding to the call that remains associated with the call after the call is transferred between two agent devices at the call center;
- a recording vendor computing system in communication with the compliance manager computing system to record the call based on the recording preference; and
- wherein the recording preference is maintained in a table indexed by UCID (universal call ID).

8. The system according to claim 7, wherein the recording preference is stored in a UUI (user-to-user information) field associated with the call.

9. The system according to claim 8, wherein the recording vendor computing system inspects the UUI field associated with the call to determine whether to record the call.

10. The system according to claim 7, wherein the recording vendor computing system begins recording the call after the call is routed to a first agent device via the switching network until the recording vendor computing system is instructed to stop recording by the compliance manager computing system.

11. The system according to claim 10, wherein the switching network is configured to route the call from the first agent device to a second agent device, wherein the recording vendor computing system begins recording the call after the call is routed to the second agent device until the recording vendor computing system is instructed to stop recording by the compliance manager computing system.

12. The system according to claim 7, wherein the recording vendor computing system does not begin recording the call until after the recording vendor computing system has inquired with the compliance manager computing system and received a response from the compliance manager computing system that the call is allowed to be recorded.

13. The system according to claim 7, wherein the recording preference is stored as a single bit.

14. The system according to claim 7, wherein the IVR system, the compliance manager computing system, and the recording vendor computing system are operated on one or more computing devices associated with the call center.

* * * * *